they coincidently function as elec-
United States Patent Office 3,474,681
Patented Oct. 28, 1969

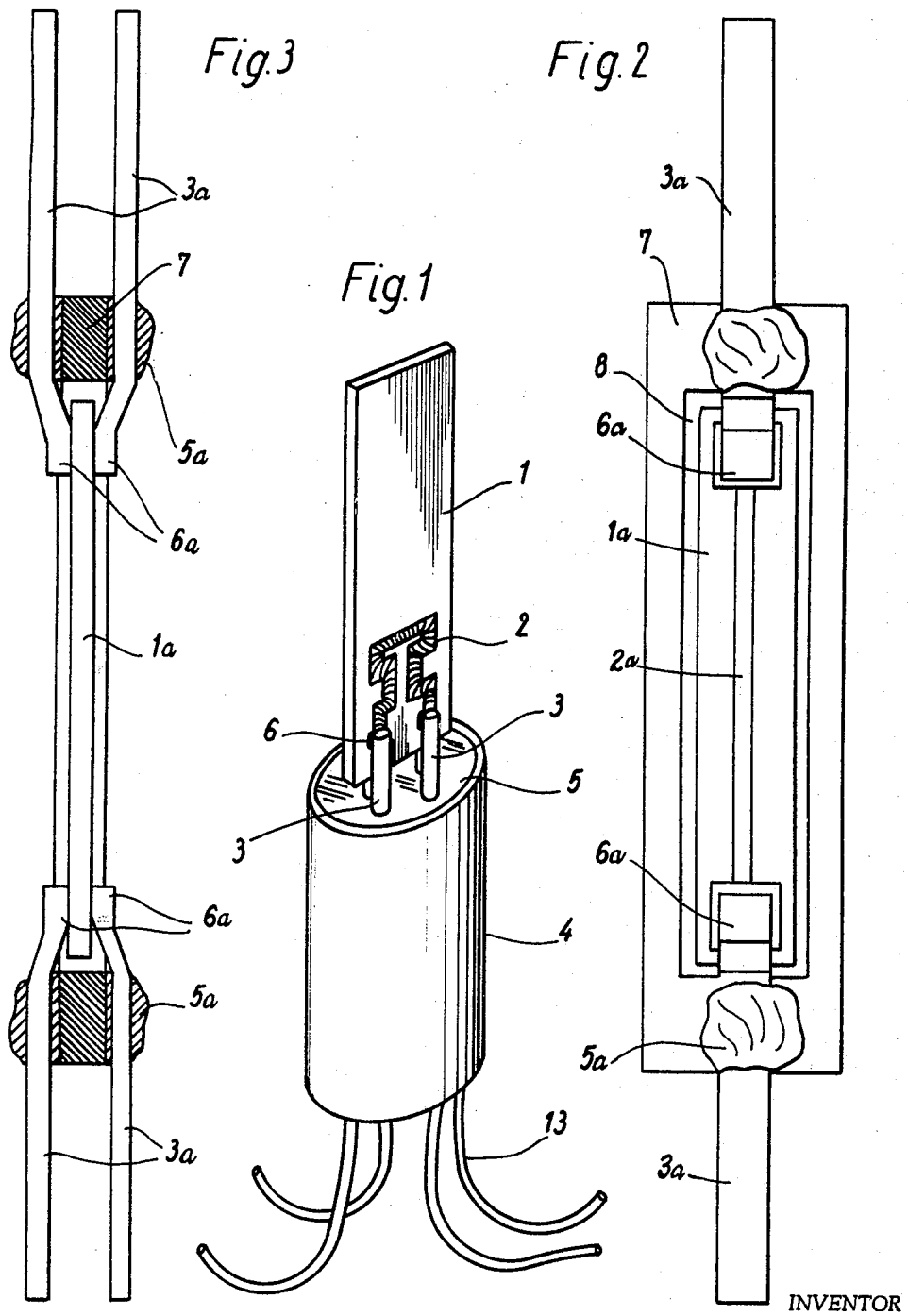

3,474,681
ELECTRO-MECHANICAL TRANSDUCER FOR TENSILE, PRESSURE AND ACCELERATION MEASUREMENTS
Odd Eriksen, Baerum, Norway, assignor to Sentralinstitutt for Industriell Forskning, Oslo, Norway
Filed May 27, 1966, Ser. No. 553,466
Claims priority, application Norway, June 1, 1965, 158,316
Int. Cl. G01l 5/12
U.S. Cl. 73—141                                    1 Claim

ABSTRACT OF THE DISCLOSURE

The electro-mechanical transducer employs a semiconductor bar having electrical contact surfaces diffused into the bar. The bar is held in fixed position by means of relatively thick and rigid electrical conductors to which the bar is secured by being held tightly between them. The holding takes place, at least in part, at the positions of the electrical contact surfaces and the conductors are electrically connected as well as being additionally mechanically secured by soldering, welding, or other suitable securing at such positions. The electrical conductors, or heavy wires, are suitably secured in insulated relationship in a holder so that the transducer can be employed directly to measure pressure, strain, tension and the other effects which transducers are capable of measuring.

---

It is known, for instance from German Patent No. 1,168,118, to adhere or alloy such transducers to the test piece as usual strain gauges. Such transducers have very small dimensions and are very difficult to fasten to the test piece. The purpose of this invention is therefore to furnish a new and suitable manner for fixing the transducer to the test piece, or which may, with advantage, 'be used in the forming of independent transducers, for use, for example, as pressure gauges.

This is achieved, according to the invention, by the bar being mounted in a holder by means of mechanical supporting elements, for example wires, which transfer mechanical forces from the bar to the holder when the bar is mechanically stressed. The mechanical supporting elements are electrically insulated from one another in such a manner that they coincidently function as electrical connections to contact areas of the semiconductor elements on the bar, the mechanical supporting elements being electrically and mechanically connected to the contact areas by soldering, welding, alloying or corresponding methods.

In one construction of the transducer according to the invention the holder consists of a short tubular piece of metal in which four metal wires are moulded in glass or similar material in order to hold the wires insulated from one another. The free ends of the wires protrude a short distance from the glass at one end of the tubular piece, and the silicon bar is wedged between these wire ends, which wire ends are also connected to contact areas on the diffused semiconductor elements by soldering or other suitable securing. The other ends of the wires serve as electrical leads to the semiconductor elements.

Preferably, a semiconductor element should be diffused on each of the two main sides of the bar, with these elements acting as the two branches in the one half of a measuring bridge.

A further advantage of using a silicon bar of this type is that at least one transistor may be diffused in this bar which may then be used to amplify the effective change of the electrical parameters.

In another construction of a transducer according to the invention, the holder comprises a frame having an opening in which the bar is secured with clearance around it. A semiconductor element is diffused in the two main sides of the bar and these elements have a contact point at each end. Each of the contact points is connected to an electrical lead which leads are rigidly fixed to the frame by means of insulating material.

Two examples of the invention will be described below with reference to the drawings in which:

FIG. 1 shows in perspective an electro-mechanical transducer according to the invention.

FIG. 2 shows a plan view of another construction of an electro-mechanical transducer according to the invention.

FIG. 3 shows a longitudinal section through the transducer on FIG. 2.

In a silicon bar 1, as seen in FIG. 1, with a length of 5–10 mm., a width of 1–2 mm. and a thickness of 0.1–0.15 mm., a semiconductor element 2 has been diffused in each of the two main sides. The silicon bar 1 is wedged between the metal wires 3, which protrude from the one end of a tubular piece 4 of metal which has been filled with molten glass 5. The glass holds the wires 3 firmly at their mutual distances while electrically insulating them from one another. The wires 3 are soldered to the bar 1 at 6.

The opposite ends 13 of the wires 3 protrude in desired length from the opposite end of the piece of tubing 4 and serve as leads to the semiconductor elements 2. The two elements 2, one on each side of the bar 1, preferably form the two branches in the one half of a Wheatstone bridge. The piece of tubing has a preferred outer diameter of 1.8 mm. and an inner diameter of 1.6 mm. The wires have a preferred diameter of 0.25 mm. and the pairs on each side of the bar are spaced at 0.5 mm. from one another, and protrude about 0.9 mm. from the tubular piece over the fixed end of the bar 1. The soldering at points 6 requires specially prepared contact surfaces on the semiconductor elements.

By expediently positioning the transducer and loading the outer end of the bar with a weight, the transducer is well suited for use as an accelerometer.

By giving the transducer an elastic, compliant shell which is connected to the outer end of the bar 1 by means of a spacer and covering the entire assembly covered with a thin steel shell with a hole in the end, the transducer may be used as a pressure gauge. On account of its small size, it may easily be introduced into the stomach of a patient, or into the heart, or into other organs in which pressure is to be measured.

The transducer may also be used to measure pressure, impact or strain in hollow objects by placing the bar 1 in contact with a rod in the space not subjected to any strain, while the holder 4 is fixed to the object which is subjected to strain.

The transducer may also readily be used to measure pressure transmitted to it by means of a bellows or a diaphragm. It may also be used for measuring axle torque.

Further, the transducer can be made up in the form of a dial micrometer for measuring very small distances, for example between 25 and 200 microns.

The transducer can also be used as a resonance generator by selecting a bar having general oscillatory characteristics corresponding to the resonant frequency, by securing magnetizable material to the free end of the bar 1 and placing the free end of the bar in a magnetic field.

The construction shown on FIGURES 2 and 3 employs a frame 7 in the opening 8 of which the bar 1a is positioned with clearance around it. In the two main sides of the bar a semiconductor element 2a has been diffused, which elements 2a have a contact point 6a at each end. The contact points 6a are connected for example, by soldering, to the leads 3a which in turn are rigidly fixed to the frame 7 by means of insulating material, of which glass is an example. The four leads 3 are accordingly insulated from one another, and also from the frame in any event the frame is made of electrically conducting material.

I claim:

1. An electro-mechanical transducer of the strain gauge type including an elastic bar of semiconductor material having semiconductor elements diffused therein for varying an externally supplied electric current when strain is imposed on said bar and elements, means for applying electric current to said elements, and a mounting device for supporting said bar at at least one of its ends, said current applying means comprising wire means carried by said mounting device and having at least two stiff wire ends protruding from said device, said stiff wire ends respectively engaging electrical contact areas on at least one side of said bar, said contact areas being positioned at said end in electrical connection with said elements, said wire ends thus being secured to said bar end on at least one of its sides in rigid and spaced relationship with respect to said device whereby all mechanical forces are transferred from said bar to said device when said bar is mechanically stressed and, said bar end is maintained in the same position relatively to said wire ends and to said device.

References Cited

UNITED STATES PATENTS

| | | | |
|---|---|---|---|
| 3,049,685 | 8/1962 | Wright | 338—2 |
| 3,054,915 | 9/1962 | Houck | 310—9.1 |
| 3,113,223 | 12/1963 | Smith et al. | 310—8.5 |
| 3,205,465 | 9/1965 | Lambertson et al. | 338—22 |
| 3,236,957 | 2/1966 | Karmann et al. | 179—110 |
| 3,317,761 | 5/1967 | Spears | 310—8.2 |
| 3,340,410 | 9/1967 | Sanford | 310—9.1 |
| 3,049,685 | 8/1962 | Wright | 338—2 |
| 3,293,584 | 12/1966 | Legat | 338—2 |
| 3,327,270 | 6/1967 | Garrison | 338—2 |
| 2,963,911 | 12/1960 | Courtney-Pratt | 73—517 |

RICHARD C. QUEISSER, Primary Examiner

VICTOR J. TOTH, Assistant Examiner

U.S. Cl. X.R.

73—88.5